United States Patent
Suga et al.

[11] 4,089,008
[45] May 9, 1978

[54] OPTICAL PRINTER WITH CHARACTER MAGNIFICATION

[75] Inventors: Gojiro Suga; Takashi Hirasaki, both of Tokyo, Japan

[73] Assignee: Xerox Corporation, Stamford, Conn.

[21] Appl. No.: 695,680

[22] Filed: Jun. 14, 1976

[51] Int. Cl.$^2$ .................. H04N 5/80; H04N 5/84; G03B 23/00

[52] U.S. Cl. .................... 354/5; 354/10; 346/108; 340/324 AD; 358/300; 178/30; 178/15

[58] Field of Search .................. 354/5–10, 354/4; 355/66; 346/108; 340/324 AD; 178/30, 15; 350/161 W; 358/235, 285, 287, 300, 302

[56] References Cited
U.S. PATENT DOCUMENTS

| | | |
|---|---|---|
| 3,653,067 | 3/1972 | Anderson et al. ........... 350/161 W X |
| 3,800,303 | 3/1974 | Picquendar et al. ............. 354/6 |
| 3,820,123 | 6/1974 | Ammann ..................... 354/9 |
| 4,000,493 | 12/1976 | Spaulding et al. ............. 354/5 X |
| 4,019,186 | 4/1977 | Dressen et al. ............... 346/108 |

*Primary Examiner*—L. T. Hix
*Assistant Examiner*—W. J. Brady

[57] ABSTRACT

An optical printer comprises a mechanical scanner, which scans a modulated light beam across a recording medium in a main or horizontal direction at a fixed speed. An acousto-optic deflector performs auxiliary scanning of the beam in a vertical direction onto the mechanical scanner at a constant rate and is connected to a deflection signal generator. The deflection signal generator adjusts the stroke length of auxiliary scan in accordance with the magnification ratio and simultaneously adjusts the frequency of auxiliary scanning by the reciprocal of the magnification rate of the character to be printed. Furthermore, optical density is maintained constant for various character sizes by providing auxiliary gate pulses proportional to the square of the relative character size, which are AND gated with a character information signal to effect a light modulation signal for modulating the beam.

1 Claim, 7 Drawing Figures

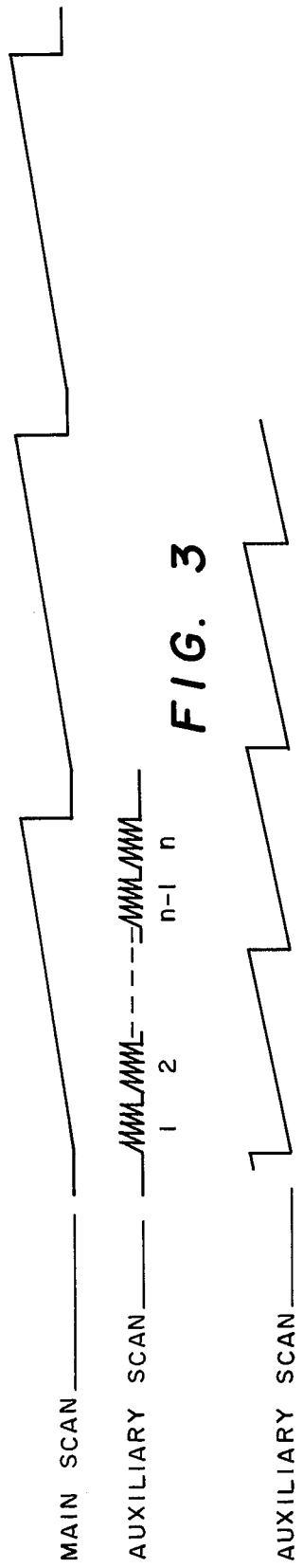
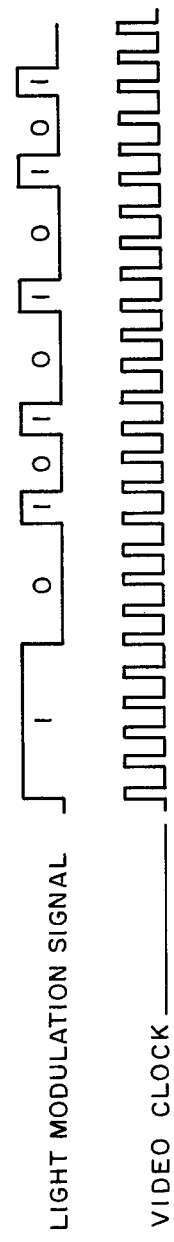
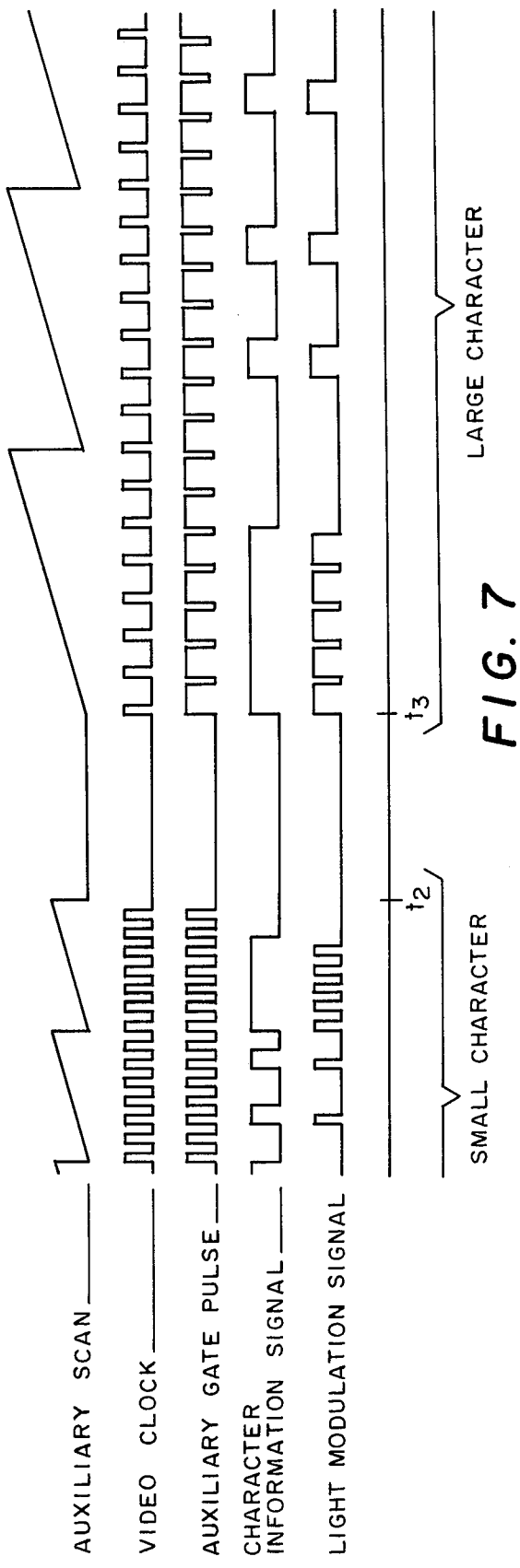

OPTICAL PRINTER WITH CHARACTER MAGNIFICATION

DESCRIPTION OF THE INVENTION

The present invention relates to an optical printer capable of changing a character magnification ratio.

It is an object of this invention to provide a scanning mechanism with a means for changing the magnification ratio of characters without changing the speed of the scanning mechanism.

It is a further object of this invention to change the magnification ratio of characters without changing the speed of the scanning mechanism while maintaining the optical density of the various size characters constant.

Other objects of this invention will become apparent from the following description with reference to the drawings wherein:

FIG. 3 is a waveform chart showing the timing of main and auxiliary scanning in the printer of FIG. 1;

FIG. 4 is a waveform chart showing the timing of auxiliary scanning and light modulation in the printer of FIG. 1;

FIG. 7 is a waveform chart showing the timing of each operation in the printer of FIG. 5.

Figure 1:
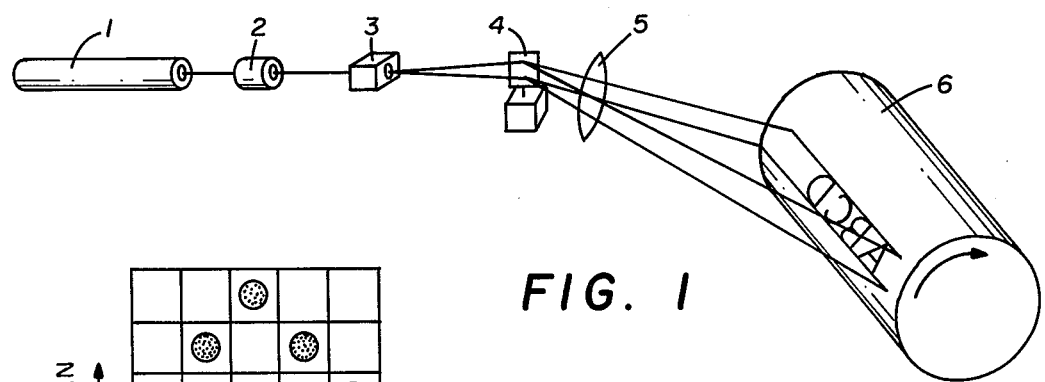
FIG. 1 illustrates a conventional optical printer.
Figure 2:
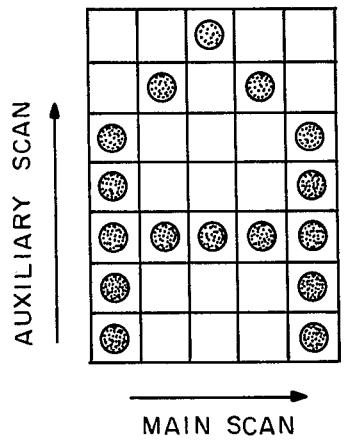
FIG. 2 illustrates a character composed of a dot matrix.

With the recent trend toward attainment of high-speed printers for use in computer output units and other similar units, the optical printer based on the combination of an optical character generator and electrophotography has come to be employed. Generally, the optical printer is composed in such a manner as shown in FIG. 1. A light beam emitted from a laser light source 1 is modulated by a light modulator 2 in accordance with information. The light modulator 2 consists of, for example, a pocket-type cell which is made of potassium dehydrogen phosphate and serves to convert periodically a refractive index in proportion to the level of an applied voltage representing an electric signal. After modulation, scanning in the column or vertical printing direction (hereinafter referred to as auxiliary scanning) is performed by a light deflector 3 cnsisting of an acousto-optic element, and simultaneously scanning in the row or horizontal printing direction (hereinafter referred to as main scanning) is performed by a mechanical deflector 4 consisting of a rotary mirror or galvanomirror. The light beam thus deflected is projected through a suitable optical system 5 onto a sensitive member 6, such as sensitive drum or photographic plate of a printing mechanism based on electrostatic photography, so that a character pattern is recorded. In the above-mentioned printer, when the height of auxiliary scanning is set to the height of a character to be printed, an optical image covering characters of one line is formed by one main scanning. For example, in case a character pattern consists of a K-row, L-column dot matrix as illustrated in FIG. 2, when printing N characters per line, auxiliary scanning is executed L × N times during one main scanning. The relationship between main scanning and auxiliary scanning is shown in FIG. 3.

In the meanwhile, the waveform modulated by the light modulator 2 is synchronized with the auxiliary scanning as plotted in FIG. 4. With regard to a video clock signal serving as reference timing for modulation of the light beam, K pulses, equal in number to the horizontal rows of the matrix constituting one character, are generated per auxiliary scanning so that the light beam is modulated dot by dot synchronously with the video clock pulses, and one vertical column of the character is printed by the light beam modulation corresponding to K dots. One character is printed by repeating this procedure L times (corresponding to the number of columns in the character matrix), and one-line printing is achieved by repeating the one-character printing N times. In the aforementioned optical printer, however, it is extremely difficult to change the character size halfway through the line during printing for the following reasons. That is, the size of a character to be printed is changed generally by changing the main and auxiliary scanning speeds. However, changing the character size in this manner presents technical difficulties in making a substantial change in the main scanning speed due to the inertia of the mechanical deflector.

The present invention accomplishes changing the character size by setting the main scanning speed of a mechanical deflector to a constant predetermined value and changing a printing magnification ratio through changes in the auxiliary scanning period and the auxiliary scanning stroke length, thereby providing an improved printer which is capable of changing the printing magnification ratio without undergoing any undesirable effect from inertia of the mechanical deflector.

Figure 6:
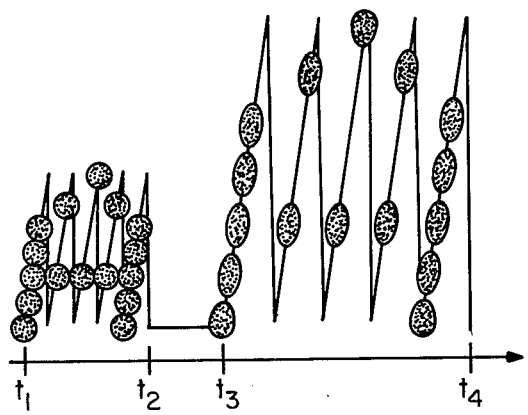
FIG. 6 illustrates a printing pattern obtained by the printer of FIG. 5.
Figure 5:
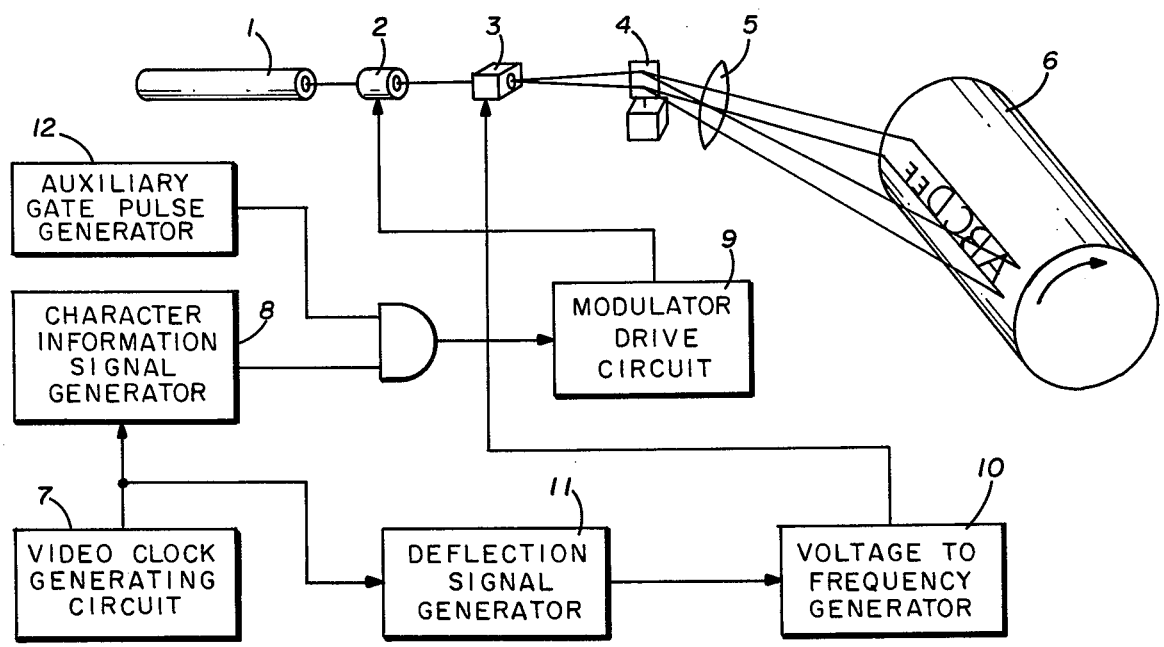
FIG. 5 is a schematic illustration of an optical printer embodying the present invention.

The present invention is described in detail with reference to an exemplary embodiment as shown in FIGS. 5 through 7. When characters to be printed and a printing magnification ratio are specified by a computer (not shown), a video clock generating circuit 7 generates video clock pulses of a period proportional to the magnification ratio in the auxiliary scanning direction for the characters to be printed. In FIG. 6, the time from $t_1$ to $t_2$ denotes normal-size printing; the time from $t_2$ to $t_3$ is a space period between characters for adjustment of a printing interval; and the time from $t_3$ to $t_4$ shows the auxiliary scan length doubled wherein a character is magnified twice both vertically and horizontally as compared with the normal-size printing. In this case, the video clock period is increased twofold in accordance with the printing magnification ratio for the character, which is doubled both vertically and horizontally. The main scanning speed of a mechanical deflector 4 is maintained at a constant speed, and the auxiliary scanning speed of an acousto-optic deflector 3 also remains constant. Thus, the dot-to-dot interval in the auxiliary scanning direction (vertical) is increased to double the time required for the normal-size auxiliary scanning, thereby doubling also the dot-to-dot interval in the main scanning direction (horizontal) to effect printing of a character, which is magnified twice both vertically and horizontally. The video clock pulses produced from the video clock generator 7 are applied to a dot matrix character information signal generator 8, and a modulator driving circuit 9 operates synchronously with the video clock pulses during a period of the presence of character information signals in accordance with the corresponding printing pattern so that the light beam emitted from the laser light source 1 is modulated by the light modulator 2 connected to the modulator driving circuit 9.

In the meantime, the video clock pulses are applied also to a deflection signal generator 11, and the deflection signal therefrom is converted into a suitable frequency by a voltage-to-frequency converter 10 and then is applied to the acousto-optic deflector 3 so as to deflect the light beam in the auxiliary scanning direction (vertical).

When the printing magnification ratio is increased twice both vertically and horizontally, the character area multiplies substantially four times, but the optical density of the character is reduced to one half because the printing time per dot, which is proportional to the extended time in the column direction of one character, increases only twice. Even though a fixed optical density is retained in the individual dots printed, it is not desirable that the density of the character as a whole change with a change in the printing magnification ratio. Therefore, an auxiliary gate pulse generator 12 (see FIG. 5) provides auxiliary gate pulses proportional to the square of the relative character size (see FIG. 7). A light modulation signal is projected according to the AND of the auxiliary gate pulse and the character information signal, and light modulation is executed in accordance with the light modulator signal thereby maintaining the apparent character density at a fixed value.

As described in detail above, the feature of changing a printing magnification ratio while holding the main scanning speed of the mechanical deflector constant renders the present invention capable of achieving a change of the character size anywhere on a line, which has been difficult heretofore due to overcoming the inertia of the mechanical deflector. Thus, the provision of, for example, an eight-point character font in the printer renders possible the printing of any desired character size such as 14-point, 16-point, etc.

Accordingly, the present invention facilitates reading of different character fonts and, furthermore, ensures high reliability of a printer since the component parts of a mechanical deflector including the rotary mirror are actuated at a fixed speed without being affected by jitter due to varying speeds.

It is to be understood that although the light modulator and the acousto-optic deflector employed in the foregoing embodiment are individual and independent of each other, the acousto-optic deflector may be so composed as to combine the function of the light modulator, and the light beam is not limited to laser light alone but may be any visible light as long as it is of a fixed wavelength.

What is claimed is:

1. An optical printer comprising: an illumination source generating a beam of light, a recording medium, a main scanning member in the path of said beam for scanning said beam at a fixed speed in a main direction across said recording medium, an acousto-optic deflector located in the path of said beam between said main scanning member and said illumination source, said deflector scanning said beam onto said main scanning member in a direction transverse to said main direction, a deflection signal generator operatively connected to said deflector for adjusting the stroke length of auxiliary scanning in accordance with the magnification ratio of a character to be printed and for simultaneously adjusting the frequency of auxiliary scanning by the reciprocal of the magnification ratio of the character to be printed.

* * * * *